Sept. 5, 1939.  G. F. ALDINGER  2,172,235
LOOP-FORMING MECHANISM FOR MOTION PICTURE MACHINES
Filed July 31, 1937  2 Sheets-Sheet 1

Gustave F. Aldinger, INVENTOR.
BY Newton N. Perrius
J. Griffin Little
ATTORNEYS.

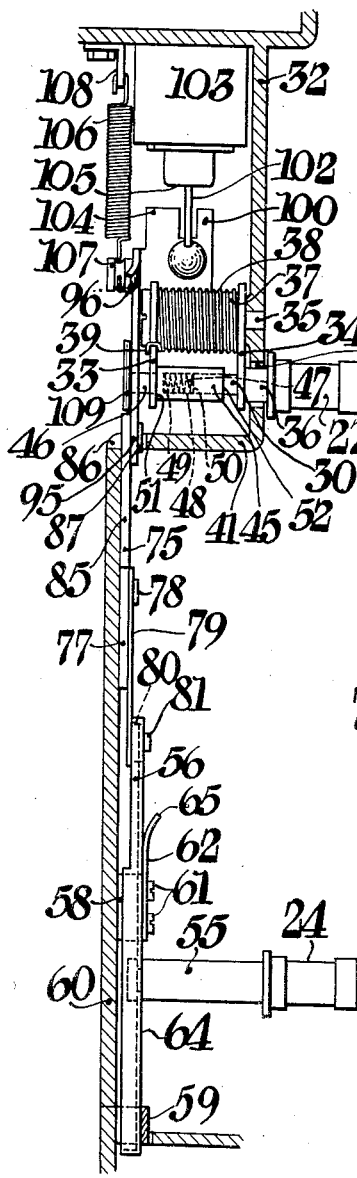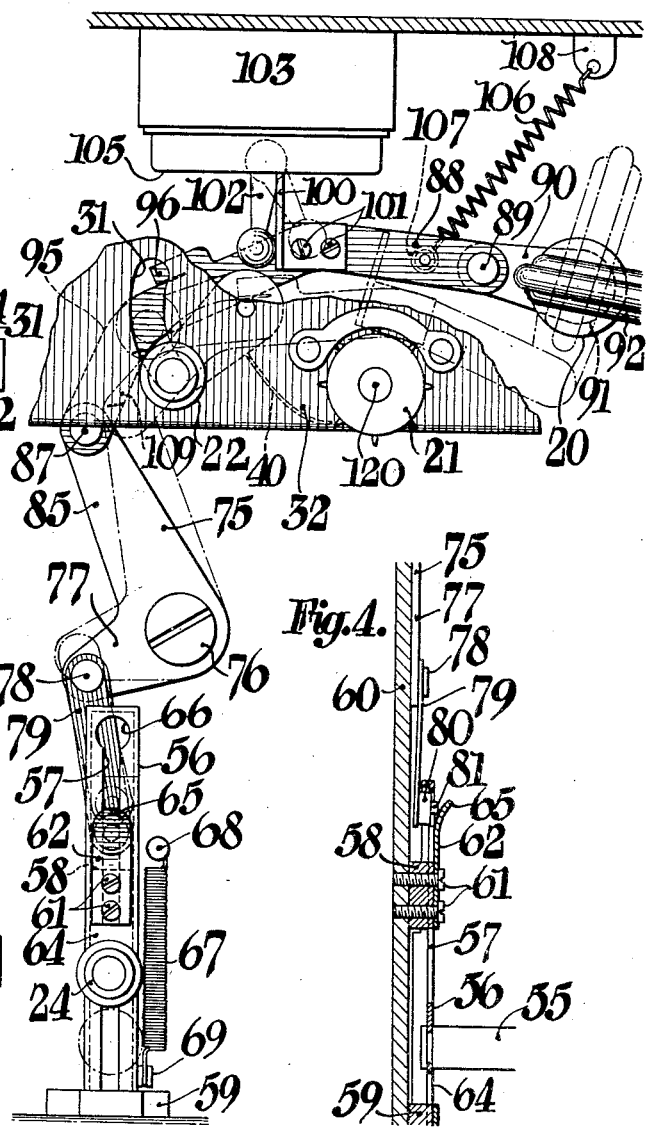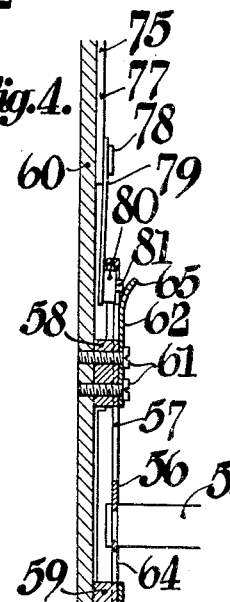

Patented Sept. 5, 1939

2,172,235

UNITED STATES PATENT OFFICE 2,172,235

LOOP-FORMING MECHANISM FOR MOTION-PICTURE MACHINES

Gustave F. Aldinger, Rochester, N. Y., assignor to Eastman Kodak Company, Rochester, N. Y., a corporation of New Jersey Application July 31, 1937, Serial No. 156,773

14 Claims. (Cl. 88—17)

The present invention relates to motion picture machines, and more particularly to an arrangement for forming the usual film loops on opposite sides of the film gate.

An object of the invention is the provision of a mechanism for easily, quickly, and accurately forming the usual compensating film loop in machines of the type described.

Another object of the invention is the provision of loop forming members which are normally in a retracted position to facilitate threading of the film strip through the machine, but which are readily movable into contact with the film strip to form the necessary film loops.

A further object of the invention is the provision of a mechanism which simultaneously forms the loop above the film gate and the loop below the film gate.

A still further object of the invention is the provision of a loop forming mechanism which is operated in timed relation to the closing of the film gate.

Still another object of the invention is the provision of such a mechanism which is also utilized to close the light switch in proper timed relation to the formation of the film loop and the closing of the film gate.

Yet another object of the invention is the provision of a loop forming mechanism which is simple in construction, positive in its action, and easy to operate.

To these and other ends, the invention resides in certain improvements and combinations of parts all as will be hereinafter more fully described, the novel features being pointed out in the claims at the end of the specification.

In the drawings:

Fig. 2 is an enlarged fragmentary view through a portion of the machine with parts in elevation and parts in section, showing the arrangement of a loop forming mechanism constructed in accordance with the preferred embodiment of the invention;

Fig. 3 is a front elevation of a portion of the structure illustrated in Fig. 2, showing the arrangement of the various parts of the loop forming mechanism; and Fig. 4 is a fragmentary sectional view of the lower portion of the mechanism illustrated in Fig. 2, with parts in elevation and parts in section showing the arrangement for disengaging the lower loop forming member from the operating mechanism.

Figure 5:
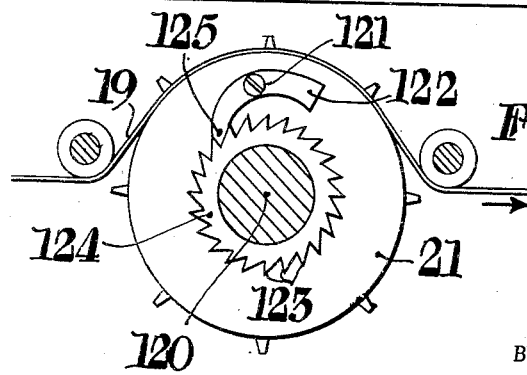

Fig. 5 is an enlarged detail view of the upper film feeding sprocket, showing the driving arrangement, therefor. Similar reference numerals throughout the several views indicate the same parts.

The present invention relates broadly to a motion picture machine of the sound type in which compensating loops of film are arranged on opposite sides of the film gate. More specifically, the invention is embodied in a mechanism which simultaneously forms both the upper and lower film loops in one operation, the formation of the loops being in proper timed relation to the closing of the film gate and to the operation of the light switch. The loop forming mechanism comprises, in general, an upper rockable arm and a lower slidable bar which carry rollers arranged to be brought into contact with the film strip to form the upper and lower loops. The arm and the bar are normally in a retracted or inoperative position so as to facilitate the threading of the film strip through the machine. The mechanism is so arranged that when the rockable arm is moved to form the upper loop, the sliding bar is simultaneously moved to bring the roller thereon into engagement with the film strip to form the lower loop.

The loop forming rollers are moved into operative position by means of levers which are pivotally connected to the two arms of the bellcrank. When the bellcrank is rotated in one direction, the levers engage the rockable arm and the slidable bar to move the rollers thereon into engagement with the film strip to simultaneously form both the upper and the lower loops. When, however, the loops have been formed, the arm and the bar are then automatically disengaged from the levers and are quickly moved to an inoperative position out of contact with the film strip. One of the levers carries a lug which is adapted to engage the light switch to close the latter during the loop forming operation, the switch remaining closed during the projection of the film strip. The bellcrank is also operatively connected to a movable lens mount which carries a portion of the film gate. The arrangement is such that the formation of a loop occurs only during the closing of the film gate and in proper timed relation thereto.

Figure 1:
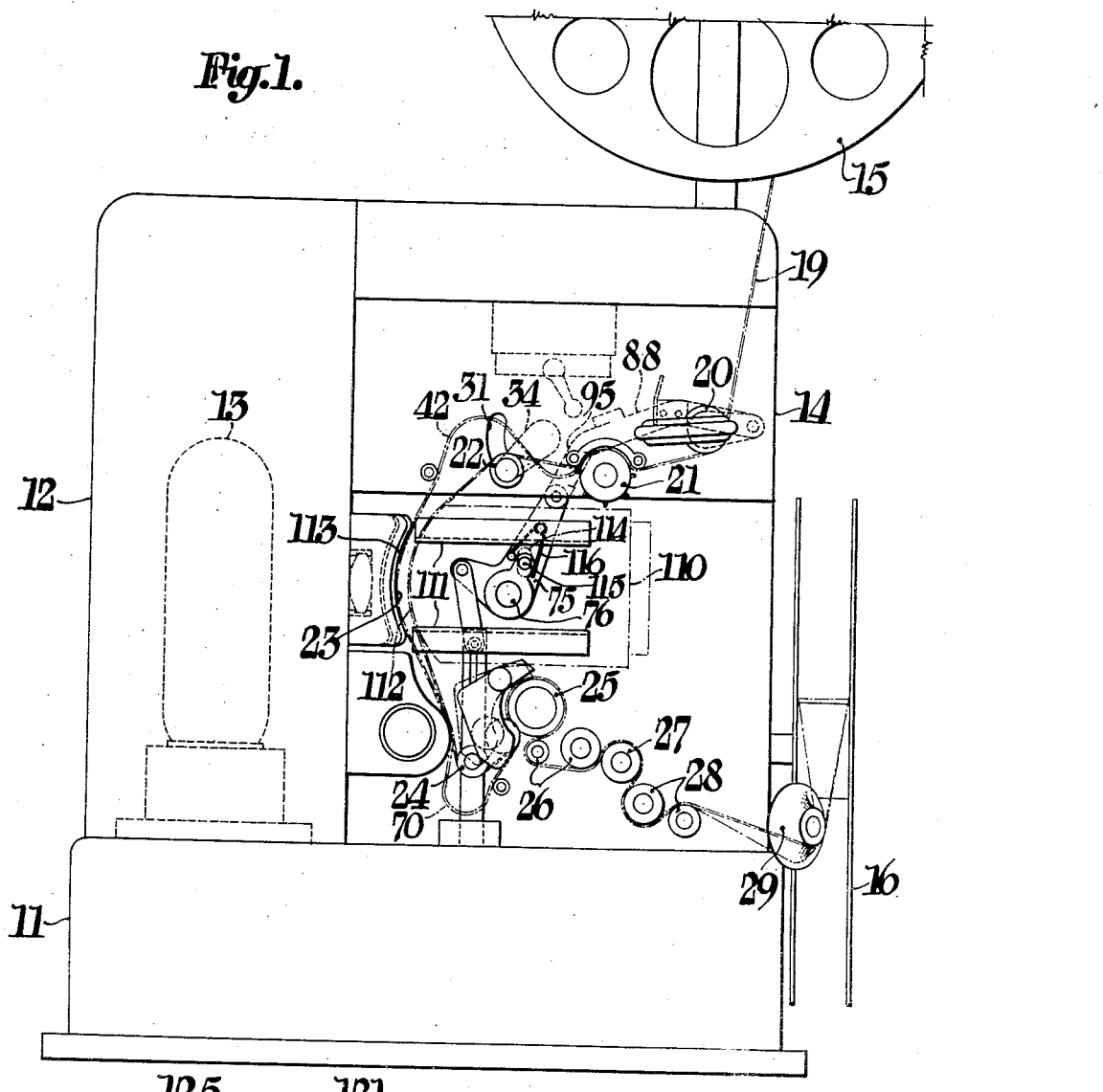
Fig. 1 is a side elevation of a motion picture machine, of the sound type, showing the arrangement of a loop forming mechanism constructed in accordance with the present invention.

Referring now to the drawings, and particularly to the Fig. 1, there is shown a motion picture machine, of the sound type, which comprises, in general, a base 11 on which is mounted a lamphouse 12 which encloses a light source such as an incandescent lamp 13. A Z-shaped support 14 is secured to and projects upwardly from the base 11, and carries the loop forming mechanism, hereinafter described. It is apparent that the base 11 and the support 14 may be broadly considered as a unitary support for the various mechanisms. A supply reel 15 and a takeup reel 16 are mounted on the machine in any suitable well-known manner. The film strip 19 is drawn from the reel 15, and is then threaded over an idler roller 20, the upper driven feed sprocket 21 hereafter more fully described, over the upper loop forming roller 22, through the film gate, generally indicated as 23, over the lower loop forming roller 24, and then over the sound roller 25, guide roller 26, the lower driven takeup sprocket 27, idler roller 28, and finally over the oblique roller 29 to the takeup reel 16, all of which is clearly shown in broken lines in Fig. 1. The loop forming rollers 22 and 24 are carried by the support 14, in a manner to be later described. The other rollers and sprockets may be mounted on a support 14 or may be carried by another suitable means.

The upper loop forming roller 22 is of the shape best shown in Fig. 2, and is rotatably mounted on a shaft or spindle 30 which extends through an arcuate slot 31 formed in the upper portion 32 of the support 14. The spindle 30 is mounted on the free end of a rockable arm which comprises, in the present embodiment, spaced members 33 and 34 oscillatably mounted on a stud 35 which is threaded or otherwise secured in a registered opening formed in the portion 32, as clearly shown in Fig. 2. The spindle 30 has formed thereon an enlarged portion or collar 36 which is adapted to engage the ends of the slot 31 to limit the movement of the roller 22. A metal spacer 37 is mounted on the stud 35 and is interposed between the members 33 and 34 to maintain these members in proper spaced relation.

A coil spring 38 is wrapped around the spacer 37, and has one end 39 thereof slipped over the member 33 and the other end 40 in engagement with an intermediate horizontal portion 41 of the support 14. This spring 38 thus tends to rock or oscillate the members 33 and 34 in a counter-clockwise direction, as viewed in Figs. 1 and 3, to move the roller 22 out of engagement with the upper film loop 42 upon the formation of the latter, as will be more fully described later.

The spindle 30 preferably terminates short of the member 33 and has mounted thereon a hollow member or plunger 45, the reduced end 46 of which projects through a registered opening, not shown, formed in the free end of the member 33. A coil spring 47 is positioned in a recess 48 formed in the plunger 45, and engages the bottom 49 of the recess and the end 50 of the spindle 30, as shown in Fig. 2. This coil spring 47 thus tends to move the plunger 45 and the end 46 thereof to the left, as viewed in Fig. 2. This leftward movement is, however, limited by reason of the engagement of a shoulder 51 of the plunger with the inner face of the member 33. Movement of the plunger 45 to the right, as viewed in Fig. 2, may bring the end 52 of the plunger into engagement with the member 34 to limit further movement. The end 46 is preferably of such length that when the plunger is moved to the extreme right position, as above described, the end 46 will not be withdrawn from the member 33, the advantages of which are obvious.

The lower loop forming roller 24 is rotatably mounted on a shaft or spindle 55 which is suitably secured, in any well known manner, to a sliding or reciprocating bar or member 56 of the shape best shown in Fig. 3. The spindle 55 is of sufficient length to position the lower roller 24 in lateral alignment with the upper roller 22, as clearly shown in Fig. 2, so that the film strip 19 may move substantially in a plane through the machine. The bar 56 is formed with a longitudinally extending slot 57 in which is positioned a guide member or block 58 secured to the lower portion 60 of the member 14 by means of screws 61 which extend through the block and into registering threaded openings formed in the portion 60, as clearly shown in Fig. 4. The lower end of the bar 57 extends through a lower guide 59, which cooperates with the block 58 to maintain the bar 57 in position so that the latter may easily slide or reciprocate relative to the support 14 to move the roller 24 from an inoperative position, as shown in full lines in Fig. 3, to the operative position, shown dotted, in which the roller 24 is in contact with the film strip 19 to form the lower loop 70. A thin metal plate 62 is positioned under the heads of the screws 61 and extends laterally over the block 58 and into engagement with the exposed surface 64 of the bar 56 to hold the latter in position on the portion 60. The plate 62 has the upper end thereof curved outwardly to form a cam 65 which is adapted to disengage the bar 56 and the roller 24 from the loop-forming mechanism, as later described. The upper end of the slot 57 terminates in a circular portion 66 for detachably securing a member of the loop-forming mechanism. A coil spring 67 has one end thereof anchored to a post 68 on the portion 60, and the other end secured to a lug 69 on the lower end of the bar 56 tending to move the bar and the roller 24 upwardly and out of contact with the film loop 70, as will be apparent from the inspection of Fig. 3.

In a machine of this type, the upper and lower loops 42 and 70 are both formed prior to the starting of the film feeding mechanism. These loops may be separately formed, but, in the preferred embodiment, they are both formed at the same time and in one operation. To this end, the present invention provides a loop forming mechanism which is arranged to simultaneously engage the end 46 of the plunger 45 to rock the spindle 30, and to also move the slidable bar 56 so as to bring both the rollers 22 and 24 into engagement with the film strip 19 to form both the upper and the lower loops.

This loop forming mechanism comprises a bellcrank 75 pivotally mounted at 76 on the portion 60 of the support 14. An arm 77 of the bellcrank is pivoted at 78 to a thin flexible member or arm 79, the free end of which is supplied with a thickened cylindrical portion or member 80 arranged to be recessed in the circular openings 66 of the sliding bar 56 to operatively connect the latter to the bellcrank 75. The member 80 is formed with a reduced cylindrical portion or lug 81 which projects through the slot 57 in the sliding bar 56. It is thus apparent that when the bellcrank is rotated in a counter-clockwise direction upon the pivot 76, as shown in full line Fig. 3, the member 79, by reason of the engagement of the portion 80 with the edges of the recess 66, will slide the bar 56 and the roller 24 downwardly. This downward movement of the roller 24 will bring the latter into engagement with the film strip 19 to form the lower film loop. However, when the lower loop has been formed, further movement of the bellcrank will bring the lug 81 into engagement with the cam 65 to force the portion 80 to the left, as viewed in Fig. 4, and out of the recess 66, thus disengaging the sliding bar 56 from the flexible member 79. As the bar 56 is now free, it will quickly return to an inoperative position, as shown in full line in Fig. 3, by reason of the coil spring 67. The roller 24 is thus momentarily moved into position to engage the film strip to form the lower film loop, and, when the loop has been formed, it is then disengaged from the loop-forming mechanism and automatically returned to a retracted or inoperative position.

The other arm 85 of the bellcrank 75 extends upwardly through a slot 86 formed in the portion 41, and is pivotally connected at 87 to one end of a lever 88. This lever is of the shape best shown in Fig. 1, and has the other end pivotally connected at 89 to the free end of a crank arm 90 which is oscillatably mounted on a shaft 91 which also carries the idler roller 20. An operating handle 92 is secured to the shaft 91 to impart movement thereto, thus by turning the handle 91 the bellcrank 75 will be moved about its point 76.

The various members of the loop forming mechanism are normally in the position shown in Fig. 1. When, however, the handle 92 is turned in a clockwise direction, as viewed in Figs. 1 and 3, the crank arm 90 and the lever 88 are moved to the position shown in full line in Fig. 3. This movement of the lever 88 brings a cam portion 95 formed thereon into engagement with the under surface of the end 46 of the plunger 45, as shown in broken line in Fig. 3. Further movement of the lever 88 will cause the end 46 to ride upwardly along the cam surface 95 to move the roller 22 into engagement with the film strip 19 to form the upper film loop 42. When the roller 22 has thus been moved sufficiently to form the upper loop, the collar 36 of the spindle 30 approaches the upper end of the slot 11.

At this time, however, a lug 96, formed from the material of the lever 88, engages the end 46 of the plunger 45 and presses or cams the latter to the right, as viewed in Fig. 2 to disengage the end 46, and hence the roller 22, from the lever 88. As the roller 22 is now free, it will be quickly and automatically returned to the retracted or inoperative position shown in Fig. 1 by reason of the coil spring 38. Thus the roller 22 is momentarily moved from an inoperative position, as shown in Fig. 1, to a position in which it engages the film strip 19 to form the upper loop, and is then automatically disengaged from the moving mechanism and again returned to its inoperative position and out of contact with the film strip.

A bifurcated member or lug 100 is secured, by means of screws or other fastening means 101, to the side of the lever 88, as best shown in Fig. 3. This lug is positioned so to engage a control arm 102 of a light switch 103 to turn on the latter when the lever 88 is moved to form the film loops, as above described. The end 104 of the lug 100 engages the under surface 105 of the light switch to limit movement of the lever 88, as is apparent from inspection of Fig. 3. When the members are in the position shown in Fig. 3, the crank arm is on dead center, thus effectively locking the bellcrank 75, the flexible member 79, lever 88 and crank arm 90 in position to hold the light switch in closed position. The crank remains in this position during the projection of the film strip.

When, however, projection is completed, the handle 92 is turned in a counter-clockwise direction, as viewed in Figs. 1 and 2, to move the crank pin off dead center. The parts are now quickly returned to the position shown in Fig. 1 by reason of a coil spring 106 which has one end thereof secured at 107 to the lever 88, and the other end anchored to the lug 108, as best shown in Fig. 2. In this return movement of the parts, a second lug or cam 109, formed from the material of the lever 88, engages the end 46 to again force the plunger 45 to the right to permit the lever 88 to freeley pass thereby to the position shown in Fig. 1.

A lens mount 110 is slidable in suitable guide rails 111, and carries a movable face guide 112 which cooperates with a stationary face guide 113 to hold the film strip 19 in flat position in the gate 23 during projection. The mount 110 is formed with a slot 114 into which a laterally projecting pin 115 on the arm 85 projects. By reason of this arrangement, the movement of the mechanism for forming the film loop is also utilized to move the lens mount toward the stationary guide 113 to close the film gate. Thus the formation of the two film loops is in timed relation to the closing of the film gate. When, however, the mechanism is returned to the position shown in Fig. 1, the lens mount is moved forwardly to open the gate, as is apparent. A hair pin spring 116 has one end thereof secured to the arm 85 and the other end in engagement with the pin 115 to provide a slightly yieldable connection between the bellcrank and the lens mount. This yieldable connection permits slight forward movement of the lens mount relative to the bellcrank to permit the passing of a film splice through the film gate, as is apparent.

Those familiar with the art will fully appreciate the fact that the upper sprocket 21 must rotate freely during the threading operation so that the film strip 19 may be readily drawn from the supply reel 116 and threaded through the machine and over the various rollers and sprockets to form the film loops 42 and 79, as above described. Yet, on the other hand, during the projection of film strip, the sprocket 21 must be positively driven so as to continually feed a supply of film to the upper film loop, as is well known. To this end, the sprocket 21 is loosely mounted on its supporting shaft 120, see Fig. 5, so that it may freely turn thereon during the threading operation. The sprocket 21 carries a laterally projecting pin or stud 121 on which is pivotably mounted a pawl 122 which is arranged to engage teeth 123 formed on the periphery of a ratchet 124 secured to and rotatable with the shaft 120. By means of this arrangement the sprocket 21 may freely turn, in the direction of the arrow, on the shaft 120 during the threading operation. When, however, the shaft 120 is rotated by suitable driving means, not shown, the teeth 123 of the ratchet 124 will engage the end 125 of the pawl 122 to rotate the sprocket 21 as a unit with the shaft 120, as will be apparent from an inspection of Fig. 5.

It is thus evident from the above description that the present invention provides an arrangement for quickly and accurately forming both the upper and lower film compensating loops in one operation. It is also apparent that the formation of these loops is automatic and in proper timed relation with the closing of the film gate and the light switch. The mechanism which forms the film loop and closes the gate is also utilized to control the light switch in proper timed relation with the formation of the loop and to the closing of the gate. Both of the film forming rollers are normally stationary and in the retracted or inoperative position, and are only momentarily moved to form the film loop on the closing movement of the film gate.

While one embodiment of the invention has been disclosed, it is to be understood that the inventive idea may be carried out in a number of ways. This application is, therefore, not to be limited to the precise details described, but is intended to cover all variations and modifications thereof falling within the spirit of the invention and the scope of the appended claims.

I claim:

1. In a motion picture apparatus, the combination with a support, a film gate comprising a movable member mounted on said suport, film-feeding means for moving a film strip through said gate, of a pair of normally retracted loop-forming rollers movably mounted on said support independently of said member and positioned on opposite sides of said gate and operatively connectable to said movable member only when the latter is moved to gate closing position, means for simultaneously engaging and moving said member to close said gate and for moving both of said rollers into momentary engagement with said strip to form separate film loops on opposite sides of said gate, means for positively disconnecting said rollers from said movable gate member and from said gate moving means immediately upon the formation of said loops and resilient means for separately moving each of said rollers out of engagement with said strip.

2. In a motion picture apparatus, the combination with a support, a film gate comprising a movable member mounted on said support, film-feeding means for moving a film strip through said gate, of a pair of loop-forming rollers positioned on opposite sides of said gate, movably positioned on said support independently of said movable member, separate mounts for said rollers, means for both moving said movable member to gate closing position and for simultaneously moving both of said mounts on said support to bring said rollers into engagement with said strip to form separate film loops on opposite sides of said gate, independent means for simultaneously and separately disengaging each of said mounts from said movable member and said moving means upon the formation of said loops, and resilient means on said support engaging said mounts for separately moving each of said rollers out of engagement with said strip.

3. In a motion picture apparatus, the combination with a support, a film gate comprising a movable member mounted on said support, film-feeding means for moving a film strip through said gate, a pair of loop-forming rollers movably mounted on said support on opposite sides of said gate and being normally operatively disconnected from said movable member, means operatively connected to said movable member for simultaneously and momentarily connecting said rollers to said movable member and for moving both of said rollers into engagement with said strip to form separate film loops on opposite sides of said gate, means including a cam on said moving means for immediately disconnecting said rollers from said movable member and said moving means upon the formation of said loops, and independent spring means for separately moving each of said rollers on said support and out of engagement with said strip.

4. In a motion picture apparatus, the combination with a support, a film gate mounted on said support, film-feeding means for moving a film strip through said gate, a pair of loop-forming rollers positioned on opposite sides of said gate, means for separately mounting each of said rollers on said support, means for simultaneously moving said mounting means to bring said rollers into engagement with said strip to form separate film loops on opposite sides of said gate, means on said moving means for disengaging one of said mounting means from said moving means upon the formation of said loops, means on said support and independent of said last mentioned means for disengaging the other of said mounting means from said moving means, and separate resilient means engaging said mounting means for independently moving said roller out of engagement with said strip.

5. In a motion picture apparatus, the combination with a support, a film gate mounted on said support, film-feeding means for moving a film strip through said gate, of a rockable arm pivoted on said support above said gate, a slidable bar reciprocally mounted on said support below said gate, loop-forming rollers carried by said arm and said bar, means for simultaneously rocking said arm and sliding said bar to move said rollers into engagement with said strip to form separate film loops on opposite sides of said gate, a cam on said moving means adapted to disengage said arm therefrom upon the formation of one of said loops, a cam on said support adapted to disengage said sliding bar from said moving means upon the formation of the other of said loops, and spring means for independently moving each of said rollers out of engagement with said strip.

6. In a motion picture apparatus, the combination with a support, a film gate mounted on said support, film-feeding means for moving a film strip through said gate, of a rockable arm pivoted on said support above said gate, a spindle carried by said arm, a spring-pressed plunger mounted on said spindle, a slidable bar reciprocally mounted on said support below said gate, a spindle carried by said bar, loop-forming rollers carried by said spindles, moving means pivotally mounted on said support and comprising a flexible member connected to said slidable bar, said moving means being movable in one direction to simultaneously rock said arm and to slide said bar to move said rollers with engagement with said strip to form separate film loops on opposite sides of said gate, a cam on said support adapted to engage said flexible member to disengage the latter from said slidable bar, and independent springs for separately moving said rollers out of engagement with said film strip.

7. In a motion picture apparatus, the combination with a support, a film gate mounted on said support, film-feeding means for moving a film strip through said gate, of a rockable arm pivoted on said support above said gate, a spindle carried by said arm, a spring-pressed plunger mounted on said spindle, a slidable bar reciprocally mounted on said support below said gate, a spindle carried by said bar, loop-forming rollers carried by said spindles, a bell crank pivotally mounted on said support, a flexible member secured to one arm of said bell crank and operatively connecting said slidable bar thereto, a lever having one end thereof pivoted to the other arm of said bell crank, a crank arm mounted on said support and pivotally secured to the other end of said lever, means for rotating said crank arm to bring said lever into engagement with said rockable arm to rock the latter and to slide said bar to move said rollers into engagement with said strip to form separate film loops on opposite sides of said gate, a cam on said lever adapted to engage and depress said plunger to disengage said rockable arm from said lever upon the formation of one of the film loops, a cam on said support adapted to move said flexible member out of engagement with said slidable bar upon the formation of the other of said loops, and separate springs secured to said rockable arm and said slidable bar to move these members out of engagement with the film strip.

8. In a motion picture apparatus, the combination with a support, a stationary film guide, a slidable lens mount carrying a film guide cooperating with said stationary guide to form a film gate, film-feeding means for moving a film strip through said gate, of a bell crank oscillatable on said support and pivotally connected to said mount, means mounted on said support and movable to one position to momentarily engage said strip to form a loop therein adjacent said gate, means operatively connecting said bell crank to said loop-forming means, means for oscillating said bell crank in one direction to simultaneously move said loop-forming means to said one position and for sliding said mount toward said stationary guide to close said gate, and a member on said oscillating means for disengaging said loop forming means from said bellcrank and said mount upon the formation of said loop.

9. In a motion picture apparatus, the combination with a support, a stationary film guide, a slidable lens mount carrying a film guide cooperating with said stationary guide to form a film gate, film-feeding means for moving a film strip through said gate, of a bell crank oscillatable on said support and pivotally connected to said mount, means mounted on said support and movable to one position to engage said strip to form a loop therein adjacent said gate, means operatively connecting said bell crank to said loop-forming means, means for turning said bell crank in one direction to simultaneously move said loop-forming means to said one position and for sliding said mount toward said stationary guide to close said gate, means on said turning means for disengaging said loop-forming means from said bell crank turning means when said loop is formed, and a spring-engaging said loop-forming means to move the latter out of contact with said strip upon said disengagement.

10. In a motion picture apparatus, the combination with a support, a stationary film guide, a slidable lens mount carrying a film guide cooperating with said stationary guide to form a film gate, film-feeding means for moving a film strip through said gate, of a bell crank oscillatable on said support and pivotally connected to said mount, means mounted on said support and movable to one position to engage said strip to form a loop therein adjacent said gate, means operatively connecting said bell crank to said loop-forming means, means for oscillating said bell crank in one direction to simultaneously move said loop-forming means to said one position and for sliding said mount toward said stationary guide to close said gate, means for disengaging said loop-forming means from said bell crank oscillating means when said loop is formed, said oscillating means being also movable in the opposite direction to move said mount away from said stationary guide to open said gate, said loop-forming means remaining stationary and out of contact with said strip when said mount is moved in said opposite direction, and resilient means engaging said loop-forming means to move the latter out of contact with said strip upon disengagement from said oscillating means.

11. In a motion picture apparatus, the combination with a support, a film gate comprising a movable gate section mounted on said support, film-feeding means for moving a film strip through said gate, a light switch mounted on said support, of a member mounted on said support and movable to one position to engage said strip to form a loop therein adjacent said gate, operating means connected to said gate section and movable in one direction to close said gate and to momentarily engage said member to move the latter to said one position and to also engage said switch to move the latter to closed position, means for automatically disengaging said member from said operating means immediately upon the formation of said loop and means for locking said operating means in position to hold said switch in closed position.

12. In a motion picture apparatus, the combination with a support, a film gate mounted on said support, film-feeding means for moving a film strip through said gate, a light switch mounted on said support, of a member mounted on said support and movable to one position to engage said strip to form a loop therein adjacent said gate, operating means mounted on said support and movable in one direction to engage said member to move the latter to said one position and to also engage said switch to move the latter to closed position, means for quickly moving said member to an inoperative position out of contact with said strip upon the formation of said loop, and means for locking said operating means to hold said switch in closed position, said operating means being also movable in the opposite direction to open said switch, said member remaining stationary and in said inoperative position during the movement of said operating means in said opposite direction.

13. In a motion picture apparatus, the combination with a support, a film gate comprising a slidable lens mount mounted on said support, film-feeding means for moving a film strip through said gate, a light switch, of a rockable arm pivoted on said support above said gate, a spindle carried by said arm, a spring-pressed plunger mounted on said spindle, a slidable bar reciprocally mounted on said support below said gate, a spindle carried by said bar, loop-forming rollers carried by said spindles, a bell crank pivotally mounted on said support, a flexible member secured to one arm of said bell crank and connecting said slidable bar thereto, a lever having one end thereof pivoted to the other arm of said bell crank, a crank arm mounted on said support and pivotally secured to the other end of said lever, a lug secured to said lever, means for rotating said crank arm and said bell crank to bring said lever into engagement with said rockable arm to rock the latter and to slide said bar to move said rollers into contact with said strip to form separate film loops on opposite sides of said gate, the rotation of said crank arm also moving said lug into position to engage said switch to close the latter, said lens mount being pivotally connected to said other arm of said bell crank so that upon rotation of the latter said lens mount is slid on said support to open and close said gate, a cam on said lever adapted to engage and depress said plunger to disengage said rockable arm from said lever upon formation of one of the film loops, a cam on said support adapted to move said flexible member out of engagement with said slidable bar upon formation of the other of said loops, and separate springs secured to said rockable arm and said slidable arm, to move these members out of engagement with the film strip.

14. In a motion picture apparatus, the combination with a support, a film gate comprising a stationary member and a slidable member movable toward and away from said stationary member to close and open said gate, of means on said support connected to said slidable member to move the latter into gate opening and gate closing position, a loop forming member movably mounted on said support adjacent said gate, said means being arranged to momentarily engage said forming member to move the latter into film engagement to form a film loop only when said slidable member is being moved to gate closing position, means for automatically disengaging said forming member from said means immediately upon the formation of said loop, and means for retracting said forming member.

GUSTAVE F. ALDINGER.